United States Patent
Portolani

(10) Patent No.: US 11,543,105 B2
(45) Date of Patent: Jan. 3, 2023

(54) COUPLING LAMPS TO POLE MOUNTS

(71) Applicant: Neri S.p.A., Longiano (IT)

(72) Inventor: Alberto Portolani, Miami, FL (US)

(73) Assignee: Neri S.p.A., Longiano (IT)

( * ) Notice: Subject to any disclaimer, the term of this patent is extended or adjusted under 35 U.S.C. 154(b) by 0 days.

(21) Appl. No.: 17/517,701

(22) Filed: Nov. 3, 2021

(65) Prior Publication Data

US 2022/0136682 A1 May 5, 2022

Related U.S. Application Data

(60) Provisional application No. 63/109,458, filed on Nov. 4, 2020.

(51) Int. Cl.
*F21V 19/00* (2006.01)
*F21V 21/116* (2006.01)
*F16B 3/00* (2006.01)

(52) U.S. Cl.
CPC .............. *F21V 19/009* (2013.01); *F16B 3/00* (2013.01); *F21V 21/116* (2013.01)

(58) Field of Classification Search
CPC ...... F21V 21/116; F21V 19/009; F21V 21/30; F16B 3/00; F16B 2/248; F16B 7/185
See application file for complete search history.

(56) References Cited

U.S. PATENT DOCUMENTS

| | | | |
|---|---|---|---|
| 3,959,645 A * | 5/1976 | Patry | F21V 21/116 248/219.3 |
| 5,615,946 A * | 4/1997 | Yeh | F21V 21/12 362/388 |
| 5,634,619 A | 6/1997 | Alessi | |

(Continued)

FOREIGN PATENT DOCUMENTS

| DE | 2051739 | 4/1972 |
|---|---|---|
| DE | 3105751 A1 | 9/1982 |

(Continued)

OTHER PUBLICATIONS

Track Lighting/Rail Lighting Modern farmhouse lights, found on www.etsy.com on Jun. 9, 2020 (20 pages).

(Continued)

*Primary Examiner* — Zheng Song
(74) *Attorney, Agent, or Firm* — Fleit Intellectual Property Law; Paul D. Bianco; Gary S. Winer

(57) ABSTRACT

A coupler has a pole coupling portion and a lamp coupling portion, enabling a lamp to be coupled to a pole. A mating connection extends between the pole coupling portion and the lamp coupling, and includes segments extending away from each of the pole coupling portion and lamp coupling portion, where the segments nest. The pole coupling portion has a pole coupling body and an internally disposed affixed ring having a gap portion. A clip is connected to the pole and is positioned within gap to limit radial rotation of the pole coupling portion. The lamp coupling portion has passageways for the passage of wires from the pole coupling portion to a lighting module attached to the lamp coupling portion. The light can be radially positioned with respect to a longitudinal axis of the pole and radially rotated with respect to the pole coupling portion.

20 Claims, 7 Drawing Sheets

(56) References Cited

U.S. PATENT DOCUMENTS

| | | | |
|---|---|---|---|
| 6,280,056 B1* | 8/2001 | Dolan | F21V 21/26 |
| | | | 362/427 |
| 7,458,552 B2 | 12/2008 | Matts | |
| 7,762,688 B2 | 6/2010 | Dixon | |
| 7,918,586 B2 | 4/2011 | Gordin | |
| 9,267,537 B2 | 2/2016 | Plomteux | |
| 9,989,196 B2* | 6/2018 | Hsu | F21K 9/20 |
| 10,420,195 B2 | 9/2019 | Sakurai | |
| 2004/0238714 A1* | 12/2004 | Slatter | A01K 97/10 |
| | | | 248/292.12 |
| 2016/0320036 A1 | 11/2016 | Clark | |
| 2016/0341406 A1 | 11/2016 | Hoog | |

FOREIGN PATENT DOCUMENTS

| | | |
|---|---|---|
| DE | 20 2006 003 261 U1 | 6/2006 |
| EP | 2551585 A1 | 7/2011 |
| EP | 3623698 A1 | 9/2019 |
| GB | 2348272 A | 9/2000 |
| JP | 10935514 U1 | 2/1997 |
| JP | H093551 | 2/1997 |
| WO | 2006/125792 A1 | 11/2006 |

OTHER PUBLICATIONS

Orren Ellis Kerfoot 8—Light 24.75 Sputnik Modern Linear LED Directional & Spotlight, found on www.wayfair.com on Jun. 9, 2020 (5 pages).

Nora NTH-REV150B Revo Universal Motorized Track Head Black, found on www.lightingsupply.com on Jun. 9, 2020 (2 pages).

* cited by examiner

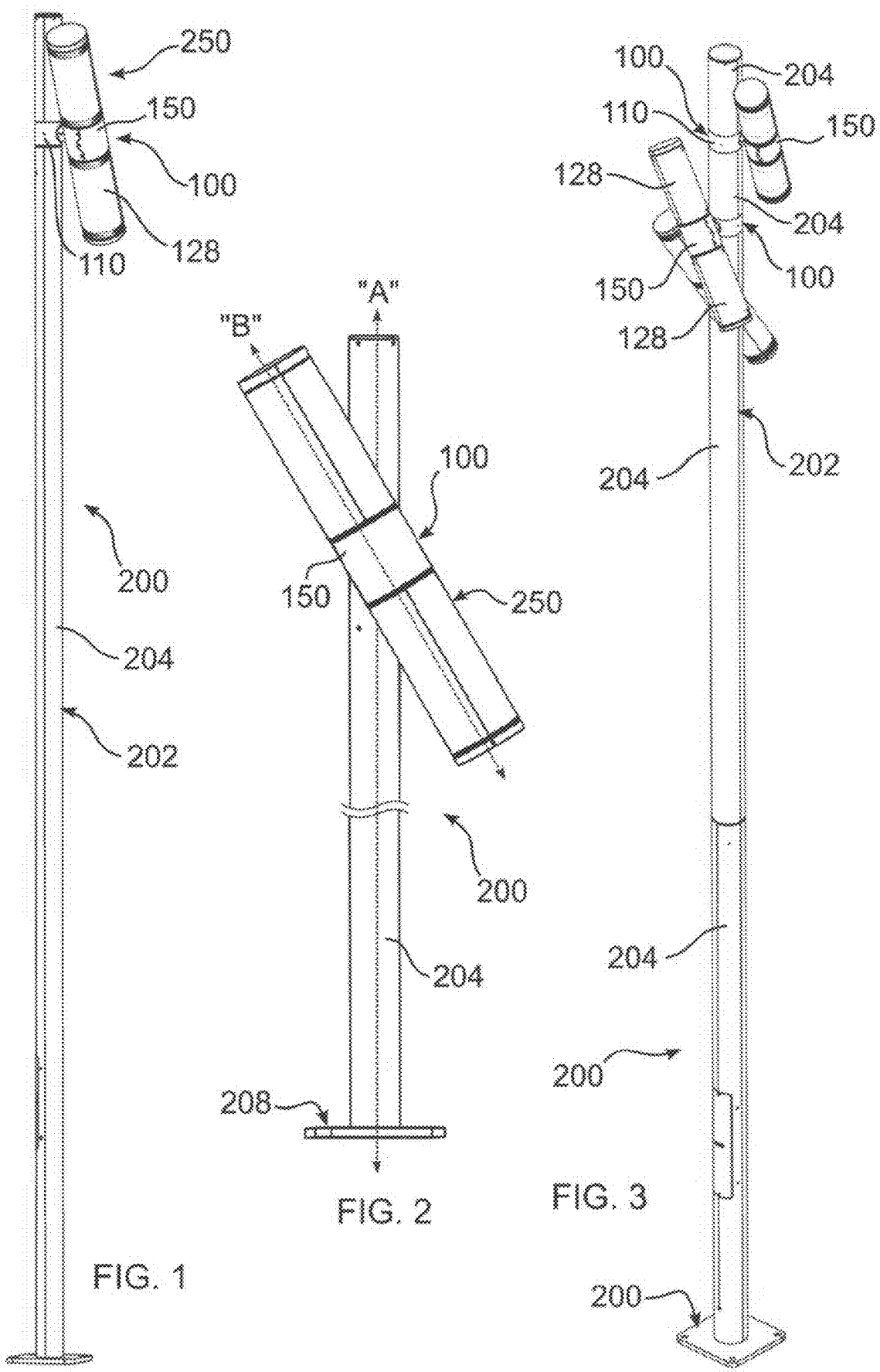

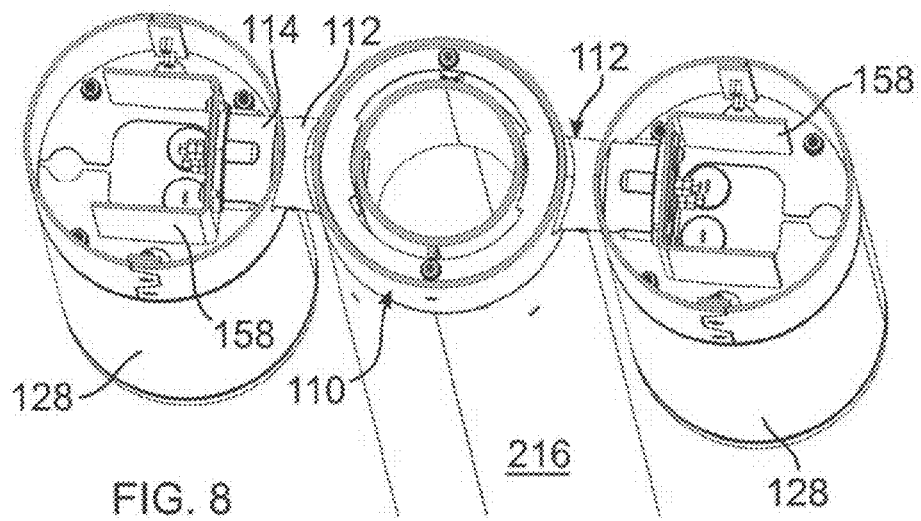
FIG. 8
FIG. 9
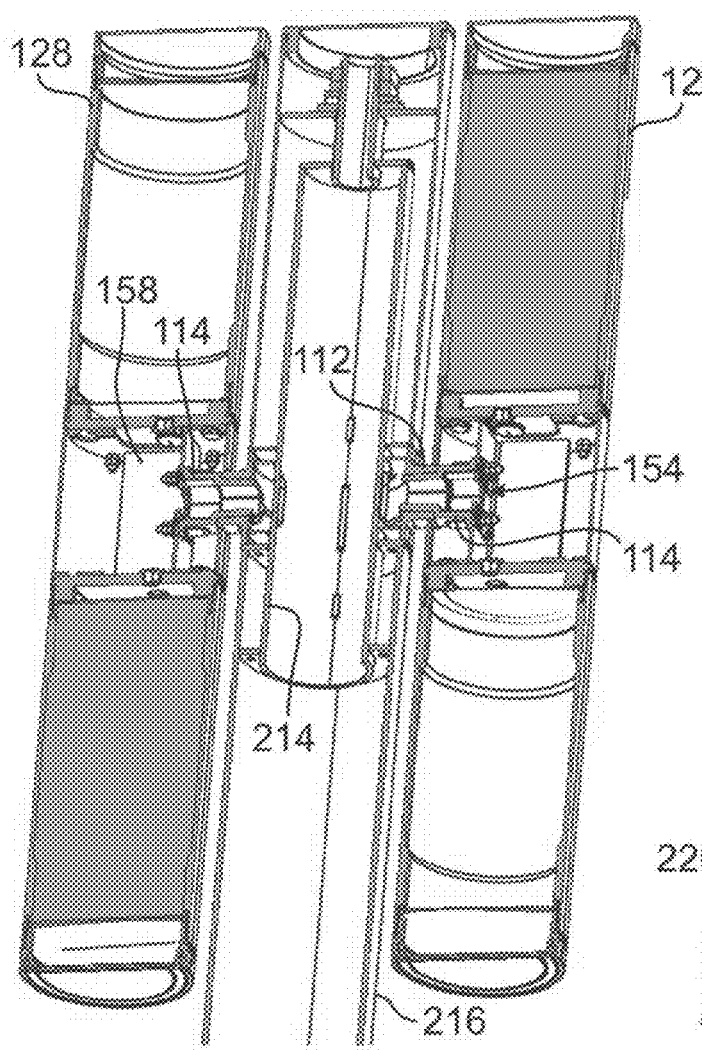
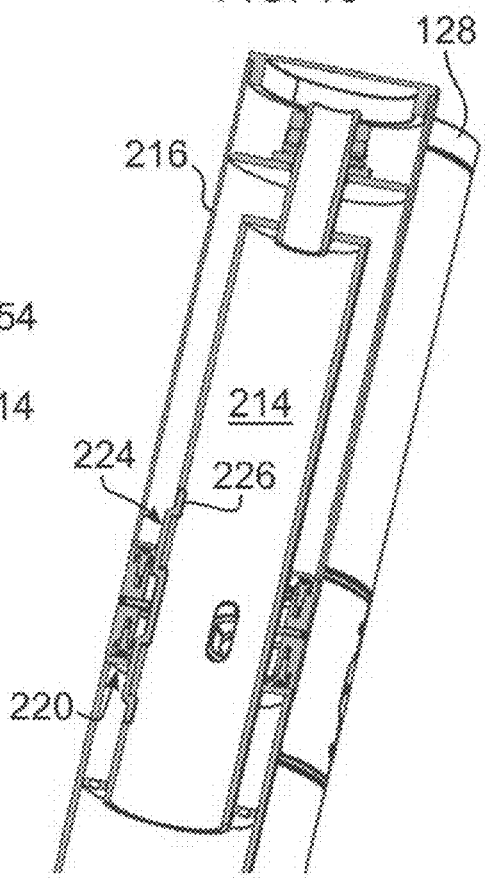
FIG. 10

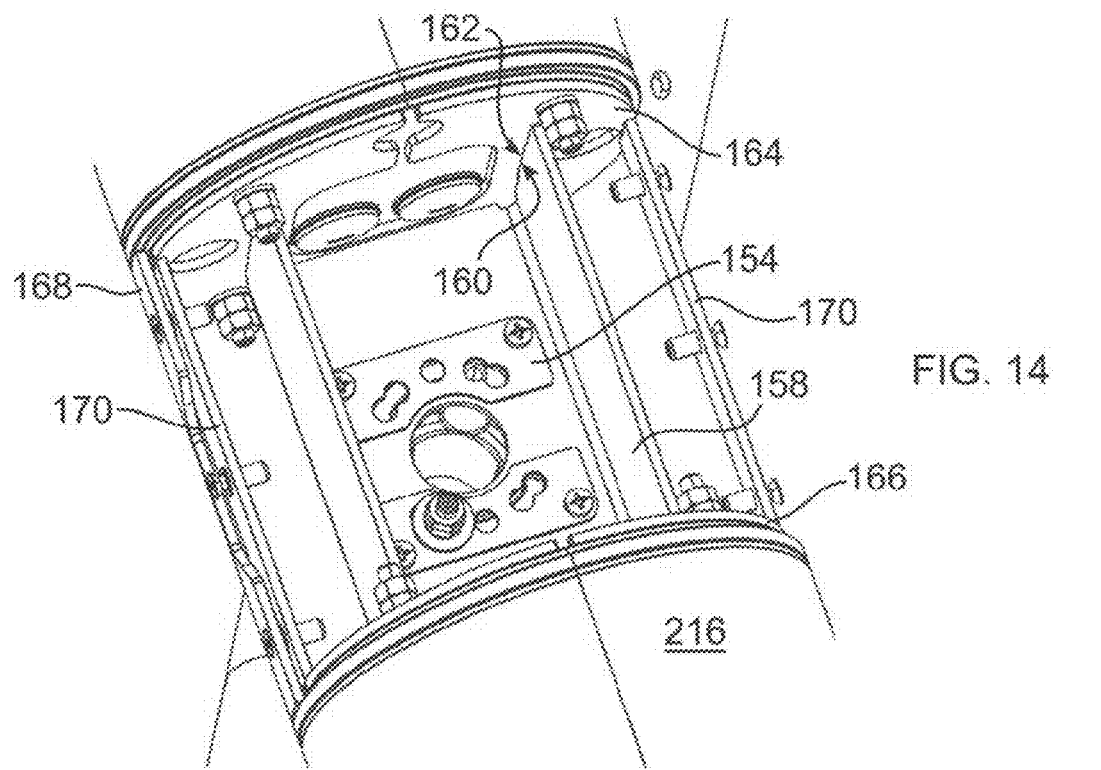
FIG. 14
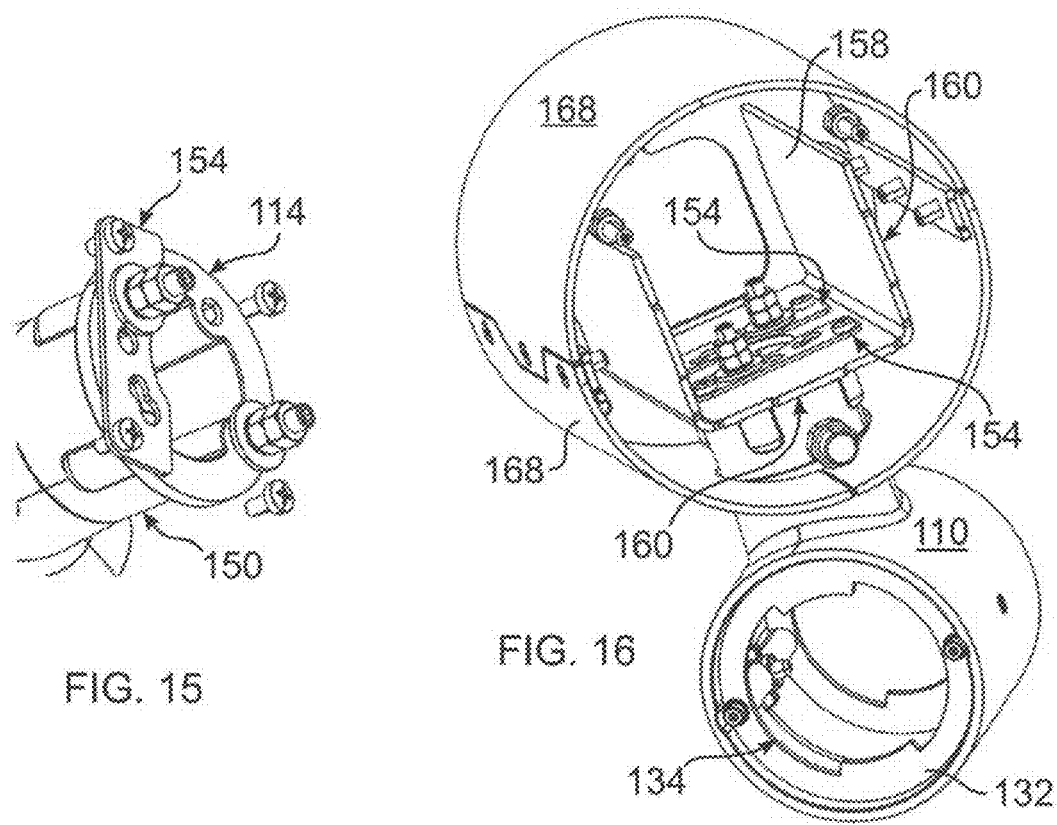
FIG. 15
FIG. 16

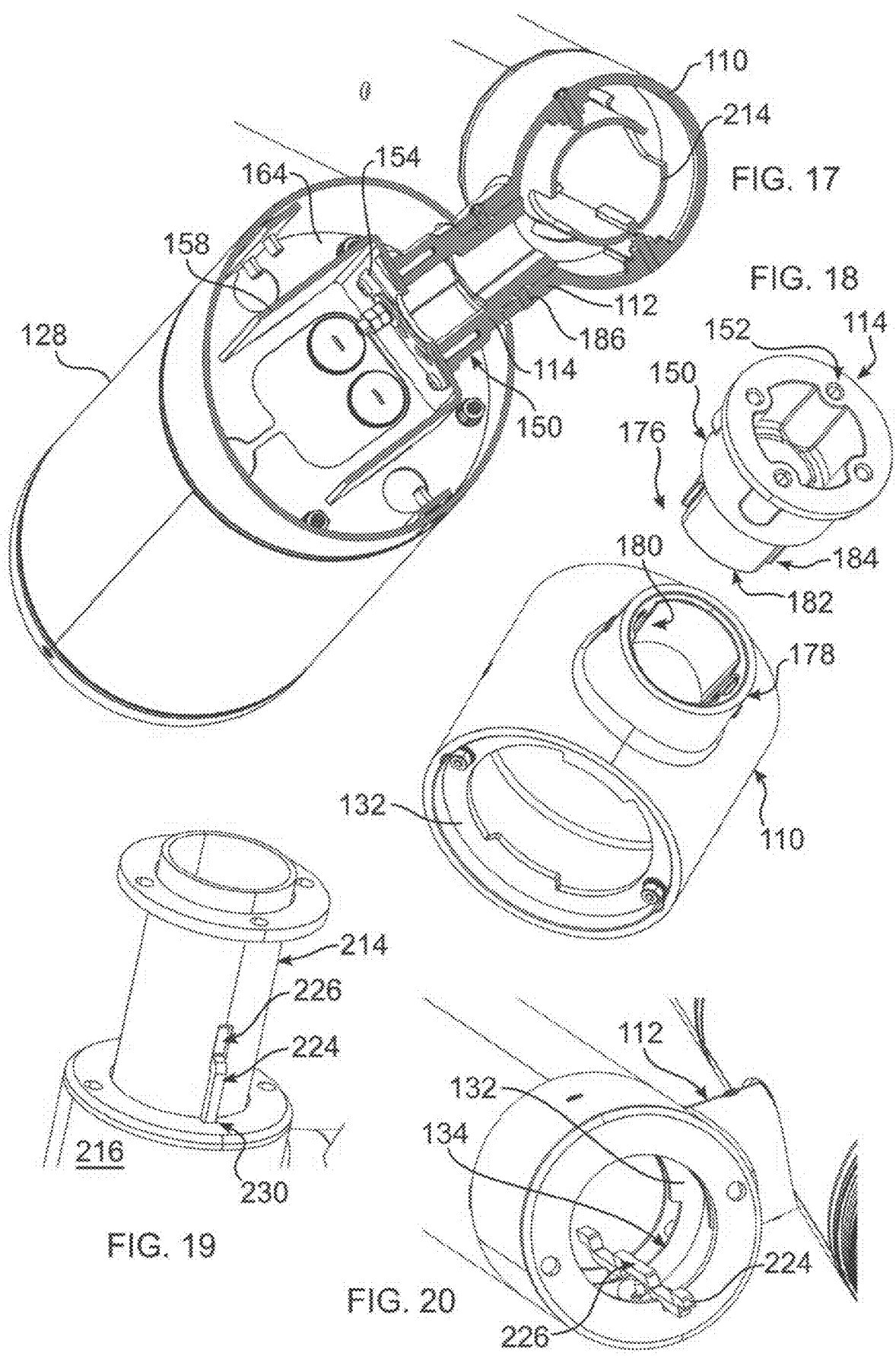

COUPLING LAMPS TO POLE MOUNTS

FIELD OF THE DISCLOSURE

This disclosure relates to mounting lamps and accessories, and more particularly to mounting lamps and accessories to poles at a desired height and angular orientation.

BACKGROUND OF THE DISCLOSURE

Lighting fixtures can be supported by a base or pedestal, chain, pole, or mounting plate, and can include one or more light emitting devices such as a bulb or LED. Fixtures can be permanently mounted, for example affixed to a floor, wall, or ceiling. A switch for operating the light can be provided upon the lighting fixture, upon a wall surface, along a power cord, or upon a remote control.

Lighting fixtures are provided with power through a permanent or temporary electrical connection. Some lamps may obtain power using a battery or solar array, and therefore do not have a wired connection to a source of power.

Some lighting fixtures have an adjustment to change a direction in which light is projected. Examples include stage lighting which can be clamped in place at a desired angle, or which can have a motorized moving mount; a desk lamp having flexible stalk; or a ceiling lamp which can be rotated or pivoted.

SUMMARY OF THE DISCLOSURE

In an embodiment of the disclosure, a device for coupling a light to a pole, comprises a coupler defining a pole coupling portion and a lamp coupling portion, the pole coupling portion and the lamp coupling portion mutually connected by a mating connection extending between the pole coupling portion and the lamp coupling portion along a longitudinal connection axis; the pole coupling portion including: a pole coupling body having passageways for the passage of wires from a pole connected to the lamp coupling portion, an internally disposed affixed ring having a gap portion, a clip connected to the pole and positioned within the gap, the gap thereby defining a limit of radial rotation of the pole coupling portion about a longitudinal axis of the pole; the lamp coupling portion including: a lamp coupling body having passageways for the passage of wires from the pole coupling portion to a lighting module attached to the lamp coupling portion, the lamp coupling body having a plurality of mounting apertures, at least one mounting plate having a plurality of openings through which a fastener can be passed to enter a mounting aperture to affix the plate to the body, the mounting plate positionable with respect to the mounting apertures to enable a plurality of radial mounting positions of the mounting plate with respect to the longitudinal connection axis; the light connected to the mounting plate, whereby the light can be radially positioned with respect to a longitudinal axis of the pole and radially rotated with respect to the longitudinal connection axis.

In variations thereof, the longitudinal connection axis is perpendicular to the longitudinal axis of the pole; the pole coupling portion has an exterior peripheral shape that matches an exterior peripheral shape of the pole; and/or the mating connection includes a first segment extending away from the pole coupling portion and a second segment extending away from the lamp coupling portion, the first and second segments mutually connected by a keyed connection preventing rotation of the first segment with respect to the second segment.

In a further variation thereof, the mating connection includes a first segment extending away from the pole coupling portion and a second segment extending away from the lamp coupling portion, the first and second segments mutually connected by a groove on one of the lamp coupling portion and pole coupling portion, and a set screw extending into the groove in attachment to the other of the lamp coupling portion and pole coupling portion.

In still further variations thereof, the device further includes a U-shaped plate affixed to the at least one mounting plate, the U-shaped plate affixed at each of two opposed ends to an end plate, at least one of the end plates connectable to a light; the device further includes at least one cover mounting plate affixed to the lamp coupling portion, and at least two fastening plates connectable to the at least one cover mounting plate to enclose an interior of the lamp coupling portion; and/or the pole coupling portion including a plurality of mating connections each extending between the pole coupling portion and a lamp coupling portion along a longitudinal connection axis, whereby a plurality of light coupling portions are connected to a single pole coupling portion.

In other variations thereof, the pole is attached to a plurality of pole coupling portions each connected to at least one of a lamp coupling portion and a mechanical accessory, each of the plurality of pole coupling portions mutually separated by a pole segment; the pole segments including an inner pole and an outer pole; the pole comprises a plurality of pole sections, each of the pole sections limited in rotation with respect to the other by a clip embedded into each of the pole sections, the clip disposed within a groove in a circular ring affixed to at least one of the pole sections; and/or the mating connection includes a first segment extending away from the pole coupling portion and a second segment extending away from the lamp coupling portion, one of the first and second segments rotatably nested within the other of the first and second segments to enable relative rotation of the first and second segments about the longitudinal connection axis.

In another embodiment of the disclosure, a device for coupling a light to a pole comprises a coupler defining a pole coupling portion and a lamp coupling portion, the pole coupling portion and the lamp coupling portion mutually connected by a mating connection extending between the pole coupling portion and the lamp coupling portion along a longitudinal connection axis; the mating connection including a first segment extending away from the pole coupling portion and a second segment extending away from the lamp coupling portion, one of the first and second segments rotatably nested within the other of the first and second segments to enable relative rotation of the first and second segments about the longitudinal connection axis; the pole coupling portion including: a pole coupling body having passageways for the passage of wires from a pole connected to the lamp coupling portion, an internally disposed affixed ring having a gap portion, a clip connected to the pole and positioned within the gap, the gap thereby defining a limit of radial rotation of the pole coupling portion about a longitudinal axis of the pole; the lamp coupling portion having passageways for the passage of wires from the pole coupling portion to a lighting module attached to the lamp coupling portion; the light connected to the mounting plate, whereby the light can be radially positioned with respect to a longitudinal axis of the pole and radially rotated with respect to the longitudinal connection axis.

In variations thereof, the device further includes at least one set screw secured between the first and second nested segments to affix a relative rotational relation between the first and second nested segments; the lamp coupling body has a plurality of mounting apertures, the at least one mounting plate having a plurality of openings through which a fastener can be passed to enter a mounting aperture to affix the plate to the body, the mounting plate positionable with respect to the mounting apertures to enable a plurality of radial mounting positions of the mounting plate with respect to the longitudinal connection axis; and/or the pole coupling portion having an exterior peripheral shape that matches an exterior peripheral shape of the pole.

In other variations thereof, the first and second segments are mutually keyed to limit rotation of the first segment with respect to the second segment; the pole coupling portion including a plurality of mating connections each extending between the pole coupling portion and a lamp coupling portion along a longitudinal connection axis, whereby a plurality of light coupling portions are connected to a single pole coupling portion; and/or the device further includes a pole coupling portion and an accessory coupling portion, the pole coupling portion and the accessory coupling portion connected by the mating connection including the first and second segments, the accessory coupling portion connected to a mechanical device which is not a light.

In a further embodiment of the disclosure, a method for coupling a light to a pole comprises attaching a coupler to a pole, the coupler defining a pole coupling portion and a lamp coupling portion, the pole coupling portion and the lamp coupling portion mutually connected by a mating connection extending between the pole coupling portion and the lamp coupling portion along a longitudinal connection axis; assembling the mating connection, the mating connection including a first segment extending away from the pole coupling portion and a second segment extending away from the lamp coupling portion, one of the first and second segments rotatably nested within the other of the first and second segments to enable relative rotation of the first and second segments about the longitudinal connection axis, where assembling includes nesting the first and second segments; passing wires through the pole coupling portion which includes: a pole coupling body having passageways for the passage of wires from a pole connected to the lamp coupling portion, an internally disposed affixed ring having a gap portion, a clip connected to the pole and positioned within the gap, the gap thereby defining a limit of radial rotation of the pole coupling portion about a longitudinal axis of the pole; passing wires through the lamp coupling portion which includes passageways for the passage of wires from the pole coupling portion to a lighting module attached to the lamp coupling portion; connecting at least one light to the mounting plate; radially rotating the pole coupling with respect to a longitudinal axis of the pole; and radially rotating the light coupling with respect to the longitudinal connection axis; whereby light from the light coupled to the pole can be directed to a target by alignment along two different axes.

BRIEF DESCRIPTION OF THE DRAWINGS

A more complete understanding of the disclosure, and the attendant advantages and features thereof, will be more readily understood by reference to the following detailed description when considered in conjunction with the accompanying drawings, in which:

FIG. 1 depicts a lighting fixture of the disclosure, including a pole, a lamp module, and a coupler of the disclosure rotatably joining the lamp module and the pole;

FIG. 2 depicts the lighting fixture of FIG. 1, the lamp module rotated radially about two different axes;

FIG. 3 depicts a lighting fixture in accordance with FIG. 1, including a plurality of lamp modules, a plurality of couplers, and a pole comprising a plurality of sections.

FIG. 8 is a cross-section through a coupling attached to two lamp modules, taken transverse to a longitudinal axis of the pole;

FIG. 9 is a cross-section through the middle of a coupling attached to two lamp modules, taken along a longitudinal axis of the pole;

FIG. 10 is a cross-section through a coupling of two pole segments;

FIG. 14 is a perspective view of the inside of a lamp coupling portion of the coupler of FIG. 1, showing mounting plates and a U-plate of the disclosure;

FIG. 15 is a detail view of the mounting plates of FIG. 14;

FIG. 16 is a perspective view of the coupling of FIG. 1 with an endplate removed;

FIG. 17 is cross-section of the coupling of FIG. 1, taken along an axis transverse to a longitudinal axis of the pole, the lamp coupling portion disposed at an angle with respect to the longitudinal axis of the pole;

FIG. 18 is an exploded view of the keyed connection between a pole coupling portion and a lamp coupling portion of the coupling of FIG. 1;

FIG. 19 is a perspective view of a clipped coupling between pole portions;

FIG. 20 is a perspective view of a pole coupling portion of the coupler of FIG. 1; showing a position of the anti-rotation clip.

DETAILED DESCRIPTION OF THE DISCLOSURE

Figure 4:
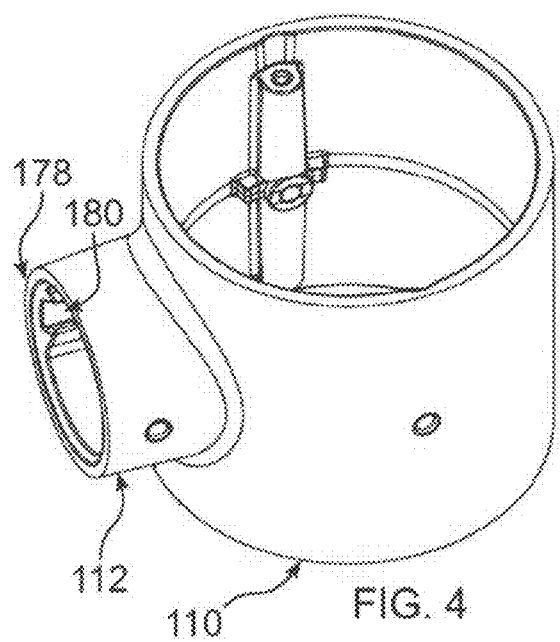
FIG. 4 depicts a coupling element of the coupler of FIG. 1.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities can be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

After reading the specification, skilled artisans will appreciate that certain features are, for clarity, described herein in the context of separate embodiments, can also be provided in combination in a single embodiment. Conversely, various features that are, for brevity, described in the context of a single embodiment, can also be provided separately or in any subcombination. Further, references to values stated in ranges include each and every value within that range.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

Headings are provided for the convenience of the reader, and are not intended to be limiting in any way.

With reference to FIGS. 1-3, a coupling 100 of the disclosure forms part of a lighting fixture 200 which includes a pole 202 in one or more sections 204, and one or more luminaires or lighting modules 250 which are coupled to pole 202 using coupling 100. The pole sections 204 are joined by coupling 100 to form an extended pole 202, for example by a threaded fastener or other type of fastener, as detailed elsewhere herein. As shown in FIG. 3, a pole base 206 can be used to secure fixture 200 to a floor or other surface. Alternatively, pole 202 can be embedded into a surface, or a lower end of pole 202 can include a lower surface plate 208 that is fastened to a surface.

In FIG. 1, module 250 is aligned to be coaxial with a longitudinal centerline "A" of pole 202. In FIG. 2, pole section 204 is in the same position as in FIG. 1, however coupling 100 has been radially rotated with respect to pole section 204 to position module 250 at a different radial orientation with respect to pole section 204. In addition, a longitudinal axis "B" of module 250 is no longer aligned with axis "A" of pole 202, having been repositioned in connection with coupling 100. Further details regarding this radial and axial repositioning is provided elsewhere herein; however, it should be understood that an ability to reposition module 250 in this manner enables casting light to a desired subject or area, without a requirement of repositioning pole 202.

Figure 5:
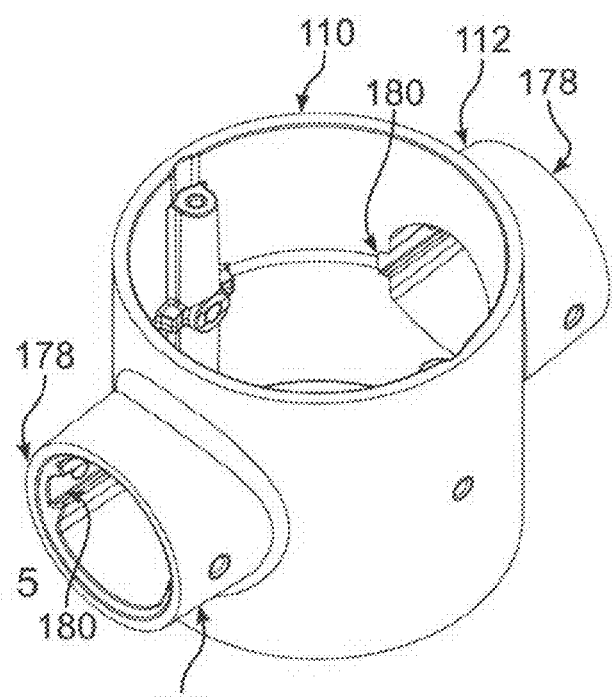
FIG. 5 depicts a coupling element of the coupler of FIG. 3.

As can be seen in FIG. 3, a plurality of couplings 100 can each couple one or more modules 250 each as described for FIGS. 1-2, whereby a single pole 202 supports a plurality of modules 250. As can be seen in FIGS. 4-5, a portion of coupling 100 forms pole coupling 110, which can comprise a single mounting socket 112, or as shown in FIG. 5, two or more mounting sockets 112. While not shown, it should be apparent that 3, 4, 5 or more mounting sockets 112 can be provided, dependent upon the size of the mounting socket 112 and the diameter of pole coupling 110. Pole coupling 110 is provided with at least a partially hollow interior and passages to enable wires to pass through the coupling and into an attached lighting module 150.

Figure 6:
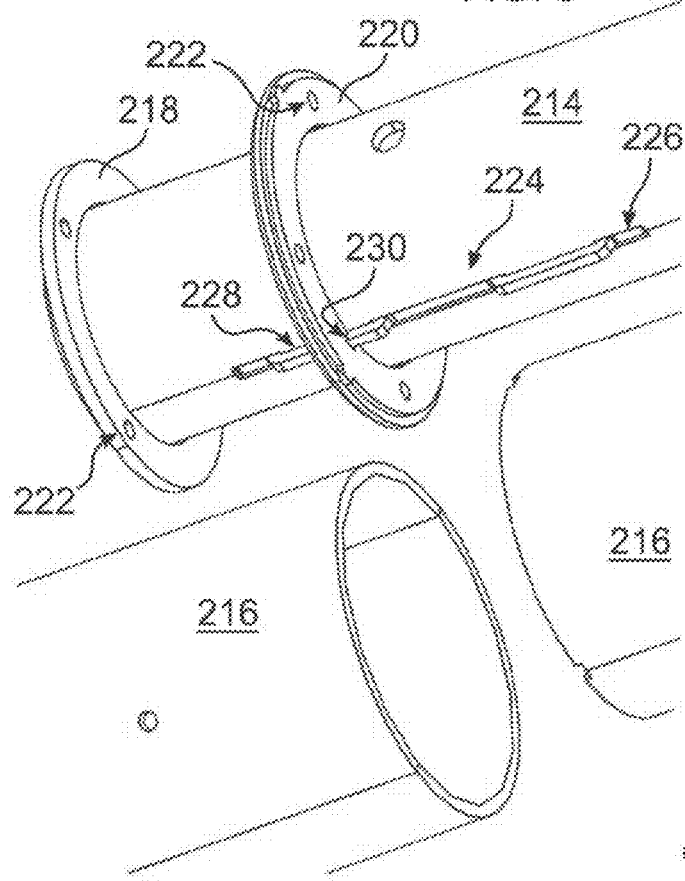
FIG. 6 depicts a clip mounted to an inner pole segment, the clip operative to limit rotation of the inner pole segment in accordance with the disclosure.
Figure 7:
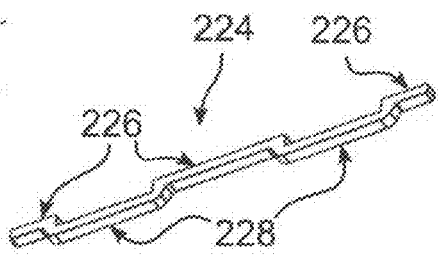
FIG. 7 is a detail of the clip of FIG. 6.
Figure 22:
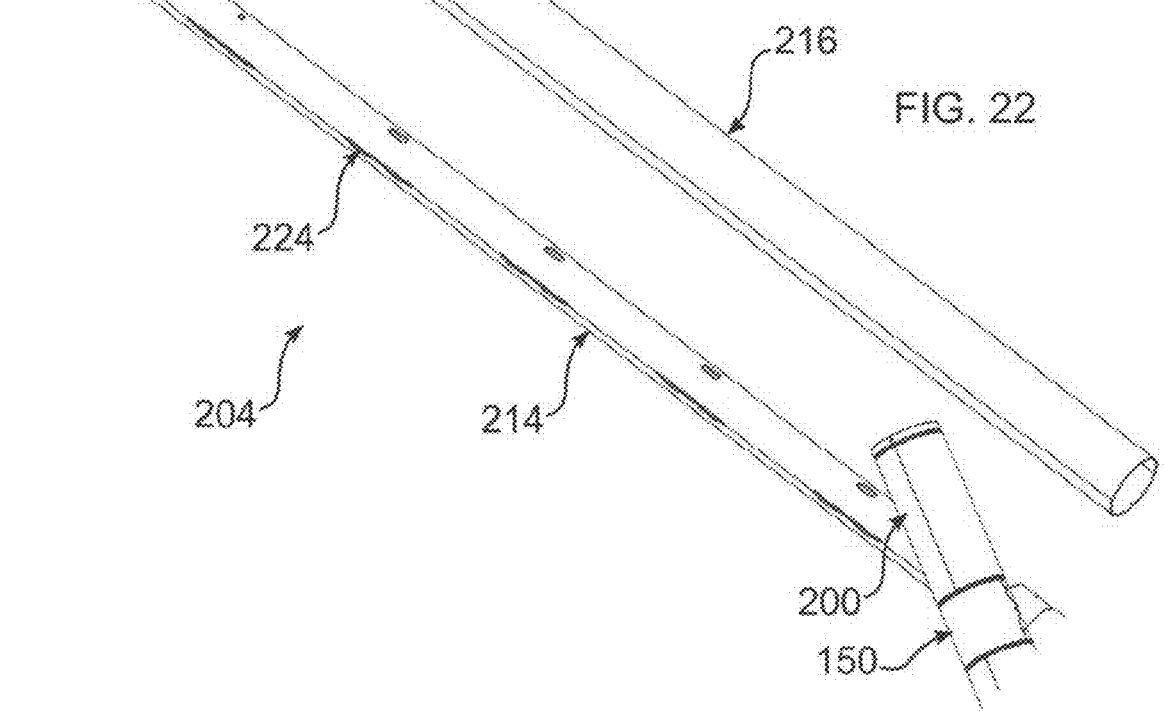
FIG. 22 is an exploded view of separated inner and outer poles.

FIGS. 6-7 and 22 depict a method of the disclosure for connecting two pole 204 segments. An inner pole segment 214 provides structural strength, and an outer pole segment 216 provides strength and a desired surface finish. Segments 214, 216 are stabilized by intermediate rings 218, 220, which space apart and orient outer pole segments 216 with respect to inner pole segments 214. Intermediate rings 218, 220 can be connected to inner and outer pole segments 214, 216 by any known means, including as examples threading, brackets, brazing, welding, interference fit, or clamps. Brackets may be fastened through apertures 222. Anti-rotation clips 224 include pole projections 226 which project into inner pole segment 214 on opposing sides of intermediate ring 220, and which further include a ring projection 228 which projects into a notch 230 in intermediate ring 220, whereby relative radial rotation between intermediate ring 220 and inner pole segment 214 is not possible. When outer pole segment 216 is affixed to intermediate ring 220, outer pole segment 216 is similarly prevented from radially rotating with respect to inner pole segment 214. In this manner, a desired orientation of modules 250, as well as an alignment of internal wire passages, are preserved.

With reference to FIGS. 8-10 and 18, coupling 100 includes a portion forming a lamp coupling 150 which connects to pole coupling 110 via a mating connection 176, as best seen in FIG. 18. Mating connection 176 is depicted as mating extensions of each of lamp coupling 150 and pole coupling 110 of similar length; however, mating connection 176 can be formed to extend more from one than the other portion. In the embodiment shown, mating connection 176 extends perpendicularly to a longitudinal axis of the pole; however, mating connection 176 can extend at a different, non-perpendicular angle. Further in the embodiment shown, pole coupling 110 includes a socket end 178 including a keyed/dovetail portion 180 which can be a groove or extension. Likewise, lamp coupling 150 includes mounting socket 114 (FIGS. 18 and 21) and that mates with mounting socket portion 112, and which includes a socket end plug end 182, including mating dovetail portion 184, which can be a groove or extension which mates with dovetail portion 180. It should be understood that the socket and plug ends could be reversed, e.g. with a plug end on pole coupling 110, and a socket end on lamp coupling 150. Dovetail grooves 180 and 184 ensure no rotation of lamp coupling 150 with respect to pole coupling 110, although the foregoing components could be rotated 180 degrees before coupling in the embodiment shown, as there are two symmetric dovetails. Likewise, additional dovetails, or a spline connection, or other form of keyed connection could provide for further relative rotational positions. In the alternative, rotation could be provided by removing dovetail grooves 180, 184 from mating connection 176, and instead providing a peripheral groove (not shown) on one of lamp coupling 150 and pole coupling 110, and one or more set screws 186 which enters this groove on the other, for example.

Notwithstanding the foregoing, additional rotational dispositions of lamp coupling 150 with respect to pole coupling 110 are provided as follows. In the embodiment shown, plug portion 182 includes a plurality of threaded apertures 152, with four such apertures 152 in the example shown (see FIG. 18). With reference to FIGS. 14-16, it may be seen that module 250 can be affixed to lamp coupling 150 by bolting one or more mounting plates 154 into threaded apertures 152. It may be seen that each of plate 154 is provided with a plurality of openings 156 for passage of a bolt. In the embodiment shown, there are five such openings 156. By selecting a particular aperture 152 and a particular opening 156, a wide range of angular positionings are possible for mounting module 250 (axis "B" of FIG. 2) with respect to pole 202 (axis "A").

With further reference to FIGS. 14-16, a U-shaped plate, or U-plate 158, is bolted to mounting plates 154. U-plate 158 includes tabs 160 at opposite ends which insert into mating plate openings 162 formed in end plates 164, 166 (FIG. 14) with an interference fit, or are otherwise secured to end plates 164, 166 by brazing, welding, crimping, threaded fastener, or any known means. In this manner, endplates 164, 166 are secured to lamp coupling 150.

Two semi-circular fastening plates 168 are bolted together using cover mounting plates 170 and threaded fasteners. In this manner, lamp coupling 150 can be enclosed, while enabling access for changing an angular orientation of module 250, or to attach or remove lamp components to plates 164, 166. Opposite ends of cover mounting plates 170 are secured to plates 164, 166 with an interference fit, or are otherwise secured to end plates 164, 166 by brazing, welding, crimping, threaded fastener, or any known means. In this manner, fastening plates 168 are secured to lamp coupling 150.

Figure 11:
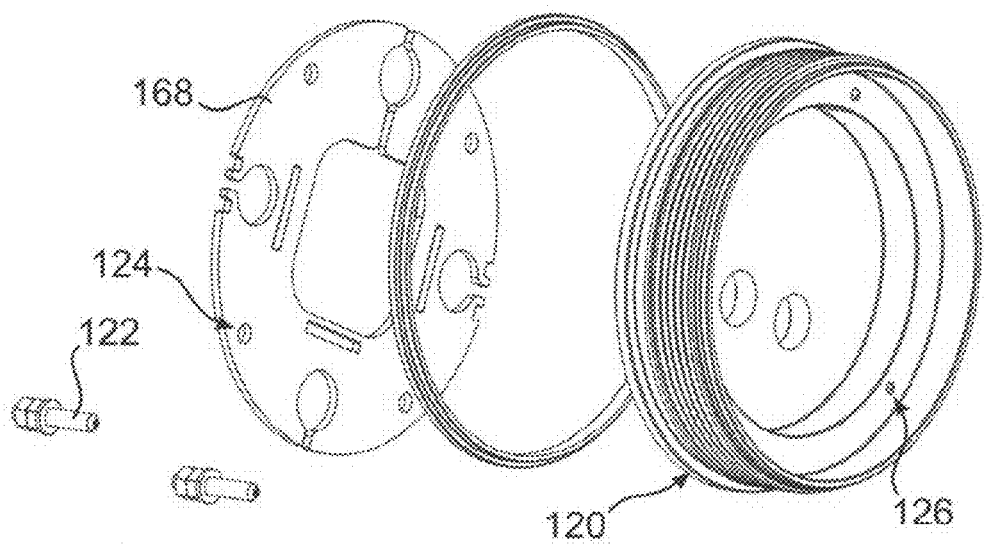
FIG. 11 is an exploded detail view of a fastening plate which are attached to coupler of the disclosure.
Figure 12:
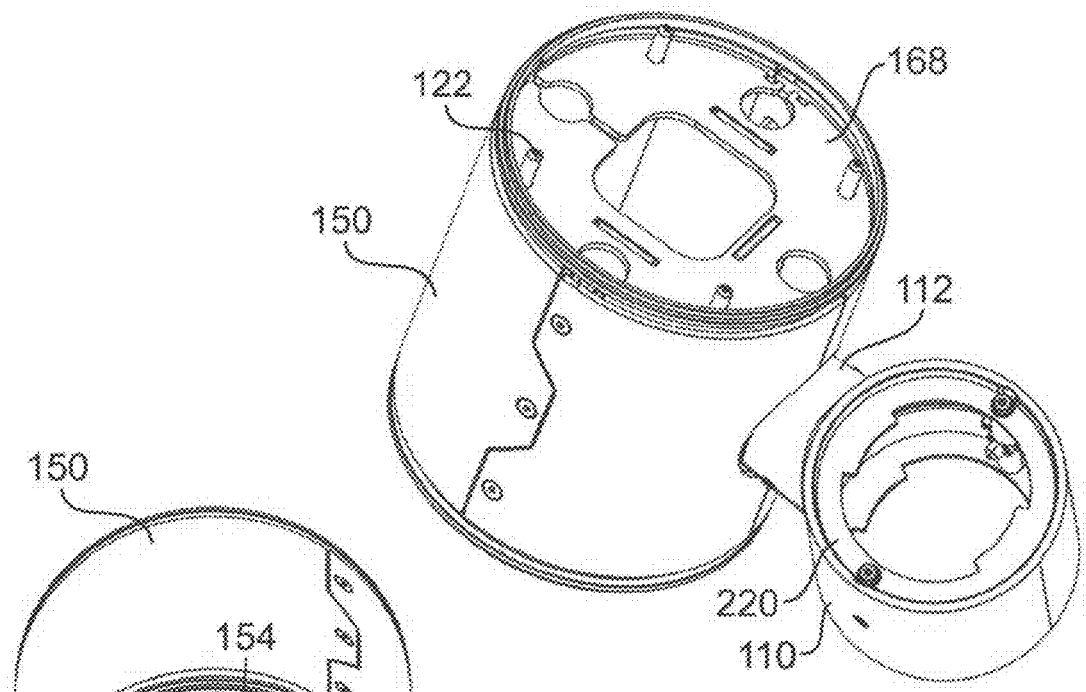
FIG. 12 is a perspective view of the coupler of FIG. 1.
Figure 13:
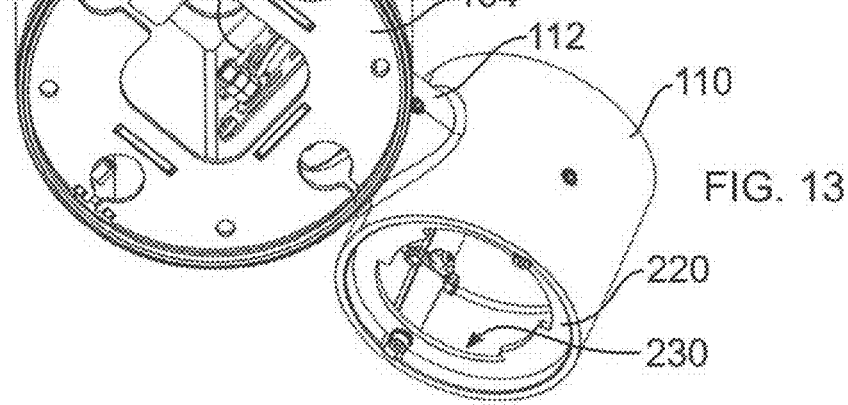
FIG. 13 is an alternative perspective view of the coupler of FIG. 1.

With reference to FIGS. 11-13, it may be seen that end plates 164, 166 can attach to a threaded ring connector 120, or may themselves be provided with peripheral threads or other form of connector, whereby a lighting component can be affixed to lamp coupling 150. In the embodiment shown, threaded fasteners 122 pass through apertures 124 in plates 164, 166, and into threaded apertures 126 in ring connector 120, to secure ring connector to lamp coupling 150. Referring again to FIG. 3, it may be seen that lighting components 128 are affixed to opposing sides of lamp coupling 150. In some configurations, only one side of lamp coupling 150 has an affixed light emitting lighting component 128, and the other side has a blank or non-light emitting lighting component 128. In another example configuration, both sides can include a light emitting lighting component 128. Wires pass from the lighting component, through coupling 100, and through pole 202 to an electrical supply connection. Data or other signal wires can similarly pass to other electrical components connected to coupling 100.

Lighting components, lamp coupling 150, and pole coupling 110 can all be provided with a visible surface finish which matches pole 202, and may all have a circular, square, or other outer shape which matches pole 202, as well. In this manner, the lighting fixture 200 has an integrated and unitary appearance. However, it should be understood that any of the aforedescribed elements can have a different shape and a different finish from pole 202, and/or a different shape or finish from each other. Lighting components 128 can be of any type, such as halogen, incandescent, fluorescent, sodium, or LED, for example, and can project light in any known pattern or power. Alternatively, lighting component 128 can provide different functions than lighting, and can for example one or more electronic, mechanical, or other devices which are useful, particularly if pole mounted, and particularly if they benefit from the positioning/aiming flexibility provided by coupling 100.

Figure 21:
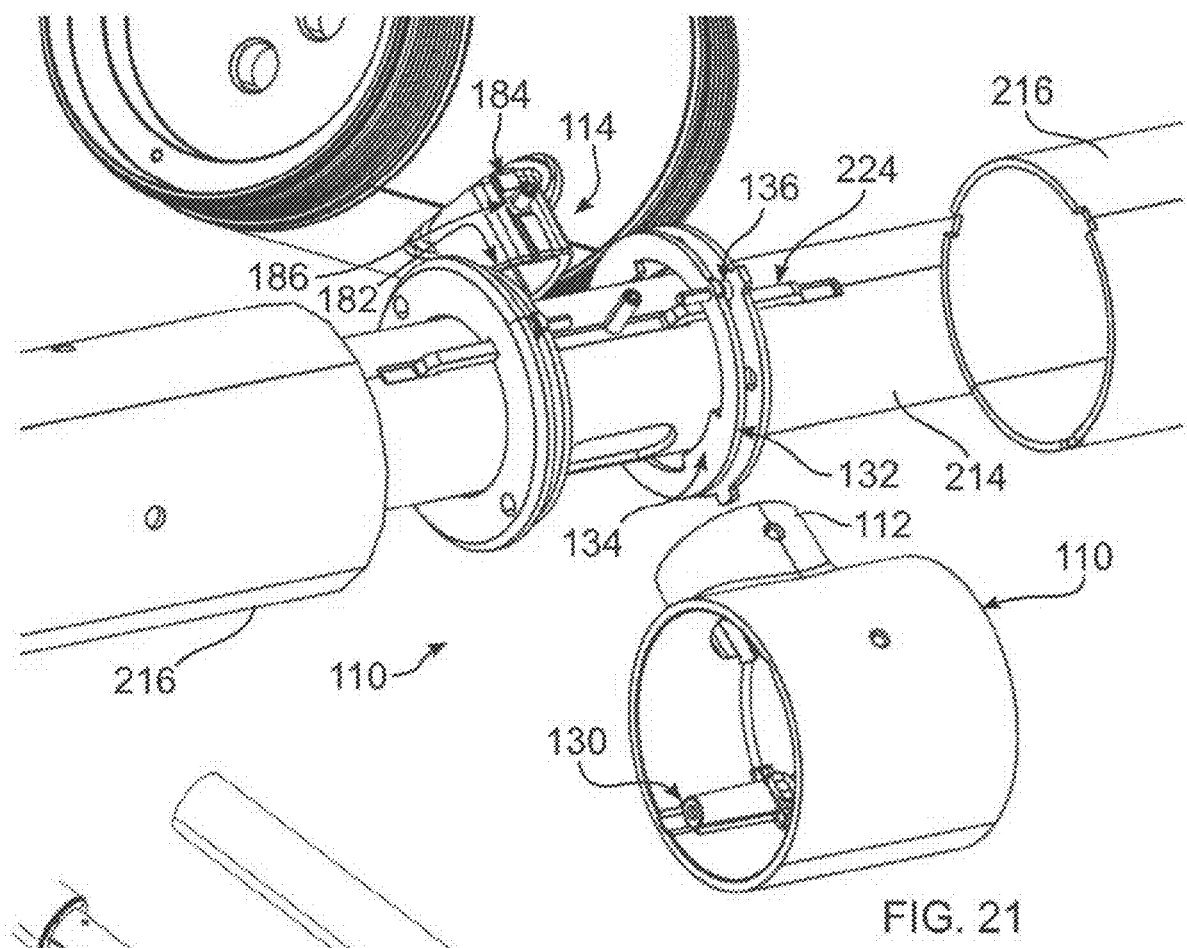
FIG. 21 is an exploded view of a pole coupling portion of the coupler of FIG. 1.

Turning now to FIG. 21, it may be seen that pole coupling 110 includes an internally disposed threaded aperture 130 to which can be affixed via a threaded fastener 136 to a rotation limiting ring stop 132 at either or both of opposed ends of pole coupling 110 along axis "A" (FIG. 2). A gap 134 spans anti-rotation clip 224, described generally elsewhere herein, which is embedded within inner pole segment 216. As such, pole coupling 110 can be rotated about inner pole segment 216 to an extent limited by gap 134, in order to protect against over-rotation which could stress or damage internal wiring (not shown) which passes from inner pole segment 216, and through pole coupling 110 and lamp coupling 150. In this manner, anti-rotation clip 224 functions as a rotation-limiting member, and gap 134 can have a length selected to enable rotation of any desired amount, for example 0 degrees, 90 degrees, 120 degrees, 180 degrees, or almost 360 degrees as limited by a thickness of clip 224.

Lighting fixtures 200, couplings 100, and other components described herein, can be fabricated using any material which has sufficient strength, durability, and if to be placed outdoors, sufficient sun and weather resistance, for intended purposes. Factors considered in material thickness and strength include the overall size of the fixture and the anticipated stresses on each component. Non-limiting examples of materials include metal, such as but not limited to aluminum and steel, concrete or natural material such as wood or stone, composites such as fiberglass or carbon fiber, or polymeric materials, and combinations of the foregoing.

As such, the disclosure provides a safe, sturdy, attractive, and highly configurable pole mounted lighting fixture 200 system, which can be provided with a variety of architectural finishes, and which can further support a variety of other electrical devices, as well as non-electrical or mechanical accessories such as flower pots or banner arms. Such mechanical accessories can include all or portions of the components described herein including a pole coupling 110 or lamp coupling 150, where the lamp coupling 150 is connected to or further forms the mechanical accessory instead of or in addition to a lighting fixture. Lighting can be provided in single or multiple lighting units per lighting fixture 200, each of which can be independently aimed and positioned along the pole. A plurality of lighting fixtures 200 of the disclosure can be provided within a given area to provide sufficient lighting for good visibility and safety throughout.

All references cited herein are expressly incorporated by reference in their entirety. There are many different features of the present disclosure and it is contemplated that these features may be used together or separately. Unless mention was made above to the contrary, it should be noted that all of the accompanying drawings are not to scale. Thus, the disclosure should not be limited to any particular combination of features or to a particular application of the disclosure. Further, it should be understood that variations and modifications within scope of the disclosure might occur to those skilled in the art to which the disclosure pertains. Accordingly, all expedient modifications readily attainable by one versed in the art from the disclosure set forth herein that are within the scope of the present disclosure are to be included as further embodiments of the present disclosure.

| List of Drawing References: | | | |
|---|---|---|---|
| 100 | coupling | 170 | cover mounting plate |
| 110 | pole coupling | 176 | mating connection |
| 112 | mounting socket portion | 178 | socket end |
| 114 | mounting socket portion | 180 | dovetail portion |
| 120 | ring connector | 182 | plug end |
| 122 | threaded fastener | 184 | dovetail portion |
| 124 | plate aperture | 186 | set screw |
| 126 | threaded aperture | 200 | lighting fixture |
| 128 | lighting component | 202 | pole |
| 130 | threaded aperture | 204 | pole section |
| 132 | ring stop | 206 | pole base |
| 134 | ring gap | 208 | lower surface plate |
| 136 | threaded fastener | 214 | inner pole segment |
| 150 | lamp coupling | 216 | outer pole segment |
| 152 | plug portion apertures | 218,220 | intermediate ring |
| 154 | mounting plate | 222 | aperture |
| 156 | plate opening | 224 | anti-rotation clip |
| 158 | U-plate | 226 | pole projection |
| 160 | U-plate tab | 228 | ring projection |
| 162 | end plate opening | 230 | ring notch |
| 164,166 | end plate | 250 | lighting module |
| 168 | fastening plate | | |

What is claimed is:

1. A device for coupling a light to a pole, comprising:
a coupler defining a pole coupling portion and a lamp coupling portion, the pole coupling portion and the lamp coupling portion mutually connected by a mating connection extending between the pole coupling portion and the lamp coupling portion along a longitudinal connection axis;
the pole coupling portion including:
a pole coupling body having passageways for the passage of wires from a pole connected to the lamp coupling portion,
an internally disposed affixed ring having a gap portion,
a clip connected to the pole and positioned within the gap, the gap thereby defining a limit of radial rotation of the pole coupling portion about a longitudinal axis of the pole;
the lamp coupling portion including:
a lamp coupling body having passageways for the passage of wires from the pole coupling portion to a lighting module attached to the lamp coupling portion,
the lamp coupling body having a plurality of mounting apertures,
at least one mounting plate having a plurality of openings through which a fastener can be passed to enter a mounting aperture to affix the plate to the body,
the mounting plate positionable with respect to the mounting apertures to enable a plurality of radial mounting positions of the mounting plate with respect to the longitudinal connection axis;
the light connected to the mounting plate, whereby the light can be radially positioned with respect to a longitudinal axis of the pole and radially rotated with respect to the longitudinal connection axis.

2. The device of claim 1, wherein the pole is attached to a plurality of pole coupling portions each connected to at least one of a lamp coupling portion and a mechanical accessory, each of the plurality of pole coupling portions mutually separated by a pole segment.

3. The device of claim 2, the pole segments including an inner pole and an outer pole.

4. The device of claim 1, wherein the longitudinal connection axis is perpendicular to the longitudinal axis of the pole.

5. The device of claim 1, the pole coupling portion having an exterior peripheral shape that matches an exterior peripheral shape of the pole.

6. The device of claim 1, wherein the mating connection includes a first segment extending away from the pole coupling portion and a second segment extending away from the lamp coupling portion, the first and second segments mutually connected by a keyed connection preventing rotation of the first segment with respect to the second segment.

7. The device of claim 1, wherein the mating connection includes a first segment extending away from the pole coupling portion and a second segment extending away from the lamp coupling portion, the first and second segments mutually connected by a groove on one of the lamp coupling portion and pole coupling portion, and a set screw extending into the groove in attachment to the other of the lamp coupling portion and pole coupling portion.

8. The device of claim 1, further including a U-shaped plate affixed to the at least one mounting plate, the U-shaped plate affixed at each of two opposed ends to an end plate, at least one of the end plates connectable to a light.

9. The device of claim 1, further including at least one cover mounting plate affixed to the lamp coupling portion, and at least two fastening plates connectable to the at least one cover mounting plate to enclose an interior of the lamp coupling portion.

10. The device of claim 1, the pole coupling portion including a plurality of mating connections each extending between the pole coupling portion and a lamp coupling portion along a longitudinal connection axis, whereby a plurality of light coupling portions are connected to a single pole coupling portion.

11. The device of claim 1, wherein the pole comprises a plurality of pole sections, each of the pole sections limited in rotation with respect to the other by a clip embedded into each of the pole sections, the clip disposed within a groove in a circular ring affixed to at least one of the pole sections.

12. The device of claim 1, the mating connection including a first segment extending away from the pole coupling portion and a second segment extending away from the lamp coupling portion, one of the first and second segments rotatably nested within the other of the first and second segments to enable relative rotation of the first and second segments about the longitudinal connection axis.

13. A device for coupling a light to a pole, comprising:
a coupler defining a pole coupling portion and a lamp coupling portion, the pole coupling portion and the lamp coupling portion mutually connected by a mating connection extending between the pole coupling portion and the lamp coupling portion along a longitudinal connection axis;
the mating connection including a first segment extending away from the pole coupling portion and a second segment extending away from the lamp coupling portion, one of the first and second segments rotatably nested within the other of the first and second segments to enable relative rotation of the first and second segments about the longitudinal connection axis;
the pole coupling portion including:
a pole coupling body having passageways for the passage of wires from a pole connected to the lamp coupling portion,
an internally disposed affixed ring having a gap portion,
a clip connected to the pole and positioned within the gap, the gap thereby defining a limit of radial rotation of the pole coupling portion about a longitudinal axis of the pole;
the lamp coupling portion having passageways for the passage of wires from the pole coupling portion to a lighting module attached to the lamp coupling portion;
the light connected to the mounting plate, whereby the light can be radially positioned with respect to a longitudinal axis of the pole and radially rotated with respect to the longitudinal connection axis.

14. The device of claim 13, further including at least one set screw secured between the first and second nested segments to affix a relative rotational relation between the first and second nested segments.

15. The device of claim 13, the lamp coupling body having a plurality of mounting apertures;
the at least one mounting plate having a plurality of openings through which a fastener can be passed to enter a mounting aperture to affix the plate to the body;
the mounting plate positionable with respect to the mounting apertures to enable a plurality of radial mounting positions of the mounting plate with respect to the longitudinal connection axis.

16. The device of claim 13, the pole coupling portion having an exterior peripheral shape that matches an exterior peripheral shape of the pole.

17. The device of claim 13, wherein the first and second segments are mutually keyed to limit rotation of the first segment with respect to the second segment.

18. The device of claim 13, the pole coupling portion including a plurality of mating connections each extending between the pole coupling portion and a lamp coupling portion along a longitudinal connection axis, whereby a plurality of light coupling portions are connected to a single pole coupling portion.

19. The device of claim 13, further including a pole coupling portion and an accessory coupling portion, the pole coupling portion and the accessory coupling portion connected by the mating connection including the first and second segments, the accessory coupling portion connected to a mechanical device which is not a light.

20. A method for coupling a light to a pole, comprising:
attaching a coupler to a pole, the coupler defining a pole coupling portion and a lamp coupling portion, the pole coupling portion and the lamp coupling portion mutually connected by a mating connection extending between the pole coupling portion and the lamp coupling portion along a longitudinal connection axis;
assembling the mating connection, the mating connection including a first segment extending away from the pole coupling portion and a second segment extending away from the lamp coupling portion, one of the first and second segments rotatably nested within the other of the first and second segments to enable relative rotation of the first and second segments about the longitudinal connection axis, where assembling includes nesting the first and second segments;
passing wires through the pole coupling portion which includes:
a pole coupling body having passageways for the passage of wires from a pole connected to the lamp coupling portion,
an internally disposed affixed ring having a gap portion,
a clip connected to the pole and positioned within the gap, the gap thereby defining a limit of radial rotation of the pole coupling portion about a longitudinal axis of the pole;
passing wires through the lamp coupling portion which includes passageways for the passage of wires from the pole coupling portion to a lighting module attached to the lamp coupling portion;
connecting at least one light to the mounting plate;
radially rotating the pole coupling with respect to a longitudinal axis of the pole; and
radially rotating the light coupling with respect to the longitudinal connection axis;
whereby light from the light coupled to the pole can be directed to a target by alignment along two different axes.

* * * * *